(12) United States Patent
Mollicone et al.

(10) Patent No.: US 7,949,946 B2
(45) Date of Patent: May 24, 2011

(54) LAYOUT AND LINE ROUTING COMPOSITION

(75) Inventors: Laurent Mollicone, Kirkland, WA (US);
Stephen M. Danton, Seattle, WA (US);
Yuri Rychikhin, Seattle, WA (US);
Jordan Sehn, Redmond, WA (US);
Florian Voss, Seattle, WA (US); Kean E E Lim, Issaquah, WA (US); William A. Manis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 11/873,658

(22) Filed: Oct. 17, 2007

(65) Prior Publication Data
US 2009/0106646 A1 Apr. 23, 2009

(51) Int. Cl.
*G06F 17/00* (2006.01)
*G06F 3/048* (2006.01)

(52) U.S. Cl. ........ 715/234; 715/204; 715/255; 715/853; 707/778; 707/798

(58) Field of Classification Search .......... 715/200–202, 715/204, 209, 234, 238, 243–256, 273, 274, 715/731, 737, 738, 762, 205, 207, 210, 211, 715/215, 226, 229, 231, 700, 760, 853, 854, 715/861; 707/600, 602, 609, 705, 778, 790, 707/796, 797, 798, 805, 829
See application file for complete search history.

(56) References Cited

U.S. PATENT DOCUMENTS

| | | | |
|---|---|---|---|
| 4,700,317 A | 10/1987 | Watanabe et al. | |
| 5,712,995 A | 1/1998 | Cohn | |
| 5,895,476 A | 4/1999 | Orr et al. | |
| 6,237,006 B1 * | 5/2001 | Weinberg et al. | 707/797 |
| 6,243,721 B1 | 6/2001 | Duane et al. | |
| 6,341,310 B1 * | 1/2002 | Leshem et al. | 709/223 |
| 6,470,383 B1 * | 10/2002 | Leshem et al. | 709/223 |
| 6,801,200 B1 * | 10/2004 | Prakriya et al. | 345/440 |
| 6,880,127 B1 * | 4/2005 | Arquie | 715/735 |
| 6,950,993 B2 * | 9/2005 | Breinberg | 715/801 |
| 7,168,035 B1 | 1/2007 | Bell et al. | |
| 7,246,307 B2 * | 7/2007 | Arora et al. | 715/208 |
| 7,477,263 B2 * | 1/2009 | Saillet et al. | 345/619 |
| 2002/0085002 A1 * | 7/2002 | Lamping et al. | 345/441 |
| 2002/0105552 A1 * | 8/2002 | Lane | 345/853 |
| 2004/0268283 A1 | 12/2004 | Perry et al. | |
| 2005/0223320 A1 * | 10/2005 | Brintzenhofe et al. | 715/517 |

(Continued)

OTHER PUBLICATIONS

M. Minas, "Concepts and Realization of a Diagram Editor Generator Based on Hypergraph Transformation", Mar. 27, 2001, pp. 1-25.*
"Information Visualisation using Composable Layouts and Visual Sets," by Tim Pattison, Rudi Vernik and Matthew Phillips, Copyright 2001, Commonwealth of Australia, Australian Symposium on Information Visualisation, Sydney, Dec. 2001, [online] [retrieved on Jul. 10, 2007], 10 pgs. Retrieved from the Internet: http://delivery.acm.org/10.1145/570000/564041/p1-pattison.pdf?key1=564041&key2=5957604811&coll=Portal&dl=GUIDE&CFID=27975664&CFTOKEN=76539852.

(Continued)

*Primary Examiner* — Maikhanh Nguyen
(74) *Attorney, Agent, or Firm* — Workman Nydegger

(57) ABSTRACT

The present invention extends to methods, systems, and computer program products for the facilitating the layout and composition of graphics. Embodiments of the present invention allow declarative input for creation and modification of layout compositions and also allows adjustments or modifications made to layout compositions. Layout compositions may be created, adjusted, and modified by input through a markup language or by user-commands and gestures. Relationships and associations among nodes and among line segments and connections between nodes which are embodied within a composition or created by an auto layout are preserved both during and after adjustments and modifications.

20 Claims, 5 Drawing Sheets

U.S. PATENT DOCUMENTS

2006/0136825 A1* 6/2006 Cory et al. .................... 715/700
2006/0198555 A1    9/2006 Hosotsubo
2006/0242557 A1   10/2006 Nortis, III
2007/0094609 A1    4/2007 Gilboa et al.
2008/0094399 A1*   4/2008 Heinkel et al. ................ 345/440

OTHER PUBLICATIONS

"Adobe PageMaker 6.5," Author unknown, Copyright 1996 Adobe Systems Incorporated, [online] [retrieved on Jul. 10, 2007], 16 pgs. Retrieved from the Internet: http://www.adobe.com/uk/aboutadobe/pressroom/pressmaterials/pdfs/pagemaker65/PM65revg.pdf.

"Requirements for an Extensible Object-Oriented Tree/Graph Editor," by Anthony Karrer and Walt Scacchi, Copyright 1990 ACM 089791-410-4/90/0010/0084, Computer Science Department, University of Southern California, Los Angeles, California, [online] [retrieved on Jul. 10, 2007], 8 pgs. Retrieved from the Internet: http://delivery.acm.org/10.1145/100000/97934/p84-karrer.pdf?key1=97934&key2=2166124811&coll=GUIDE&dl=GUIDE&CFID=28166265&CFTOKEN=52392546.

* cited by examiner

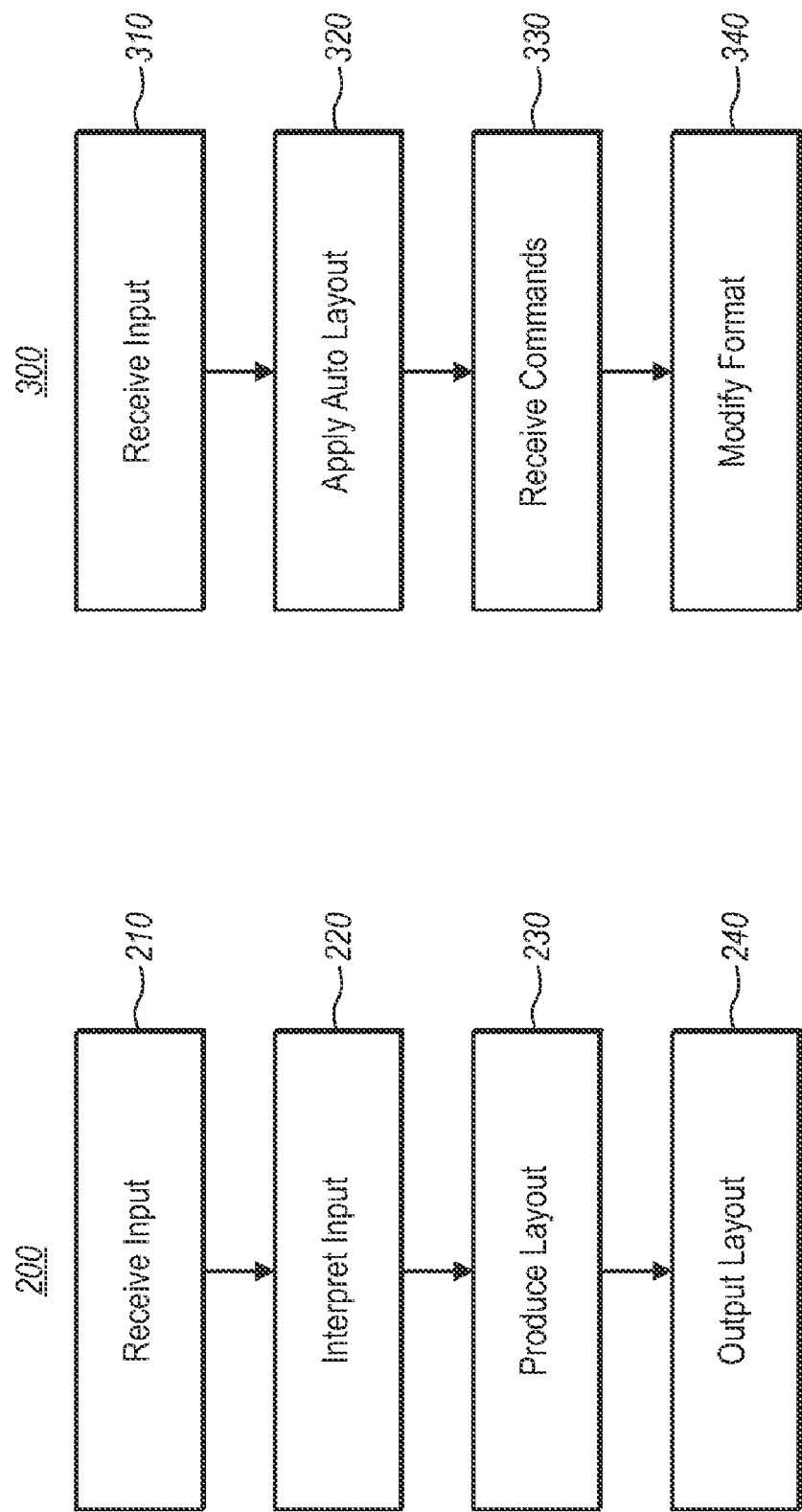

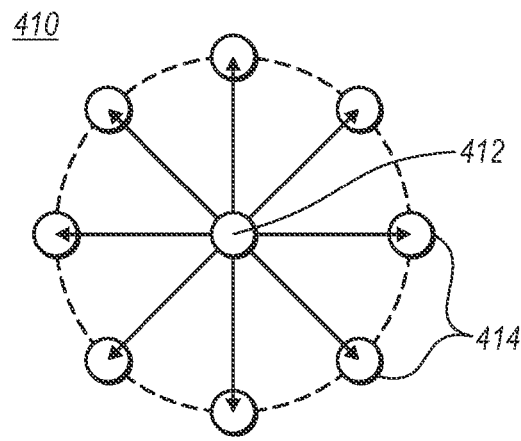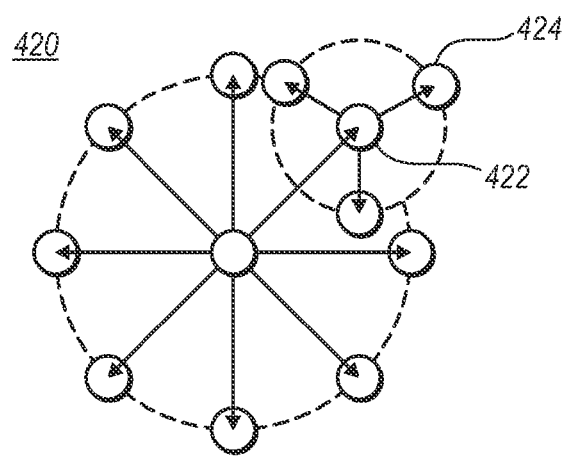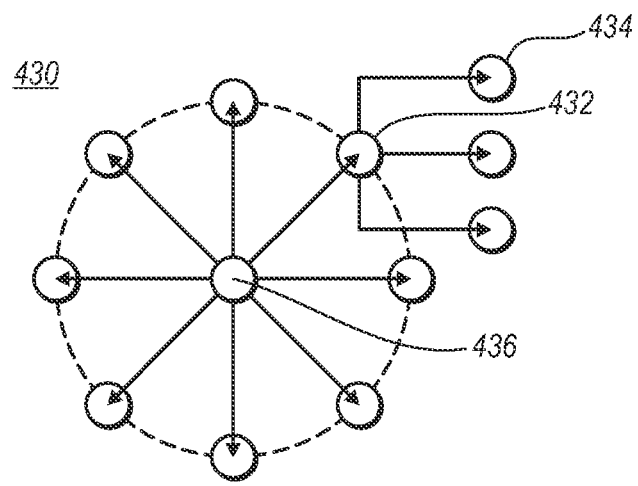
FIG. 4

LAYOUT AND LINE ROUTING COMPOSITION

CROSS-REFERENCE TO RELATED APPLICATIONS

N/A.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One task which has recently been made easier and more efficient by the use of computers is the creation and modification of graphic layout compositions. Layout compositions are constructs and documents made up of graphics, text, and possibly more, which may be employed by businessmen, engineers, scientists, and the like to describe and illustrate processes and constructs within their domains. An example of a layout composition is a flow chart depicting a particular computer program algorithm. Another example of a layout composition is a business process flow chart depicting the start to finish process of a particular business endeavor. An example of such layout compositions are those which may be produced using Microsoft's Visio™.

Such layout compositions may generally include a number of nodes which represent particular items of interest in the particular domain. For instance, a node may be a diamond or triangle which represents a business decision. A node may be a rectangle which represents a computer or business process. A node may be another shape which represents printing output on a particular printer. Nodes within a layout composition are limited only by the particular implementations of particular domain-specific or generally applicable layout systems.

In complicated business systems and complicated computer processes, the arrangement of a layout composition representing a system or process may, itself, become commensurately complicated. Manual layout of a representative layout composition may be inordinately time-consuming or may be, for some purposes, impossible.

Because of the intricate and complicated nature of a process which is to be depicted, it is often desirable to have automatic formatting of a layout composition (i.e., auto layout). However, auto layout of a layout composition may, itself, introduce correspondingly associated problems in a layout composition.

For instance, a layout composition, after an auto layout, may evenly space a large number of parallel processes (represented by nodes within the layout composition). A particular user of the layout composition might, however, desire that most nodes representing parallel processes be moved to the side as they may not be considered important. It may be desired by a user that a small number of the nodes representing parallel processes be grouped with greater spacing or in an area by themselves to indicate their relatively greater importance.

It is not always possible, using existing layout composition methods, products, and systems, to adjust or modify a layout composition which may have been formatted manually or by an auto layout. Even after having employed an auto layout, it may be impossible to manually adjust or modify the layout composition because any change to any particular node or node formatting may entail a corresponding change or modification to those nodes associated with the modified node.

Furthermore, when sharing a layout composition with others and allowing multiple authors to edit and update the composition, making revisions such as adding a shape may be difficult and frustrating if the edit must be done manually and possibly disruptive if done by typical auto-layout mechanisms, because it often requires a recomputation of the layout algorithm which can cause a large degree of repositioning and thereby destroy a user's mental model of the system prior to a change.

Current layout composition products also generally require user interaction to create and modify a layout composition. Correspondingly, it may be advantageous to be able to create or modify a layout composition using some type of structured input.

BRIEF SUMMARY

The present invention extends to methods, systems, and computer program products for the facilitating the layout and composition of graphics. The invention extends to both declarative input for creation and modification of layout compositions and also to adjustments or modifications made to layout compositions resulting from auto layout.

For example, embodiments described herein provide for a method within a computing environment which receives declarative input for composing a layout composition. The declarative input includes node identifications and layout directives and indicates relationships associating nodes within a layout composition. The declarative input, once received, is interpreted to produce a layout composition in accordance with the declarative input. The composition may be output to an output device within the computing environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Another example embodiment provides for a method of composing a layout composition comprising both auto-layout features and user-directed adjustments. Input is received which includes a plurality of nodes which are to be included within a layout composition. Auto-layout is applied to format the nodes within a layout composition and creates auto-layout relationships associating at least some of the nodes. User commands may be received which comprise adjustments to the layout of the nodes. In response to the user commands, the formatting of the nodes within the composition is modified in accordance with the user commands while the auto-layout relationships between the nodes is preserved.

Systems and computer program products are also described in some embodiments which facilitate the creation and modification of layout compositions.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of an example method for producing a layout composition;

FIG. 3 illustrates a flow chart of an example method for modifying the format of a layout composition;

FIG. 4 illustrates layout compositions in node formatting in accordance with the present invention;

DETAILED DESCRIPTION

Figure 1:
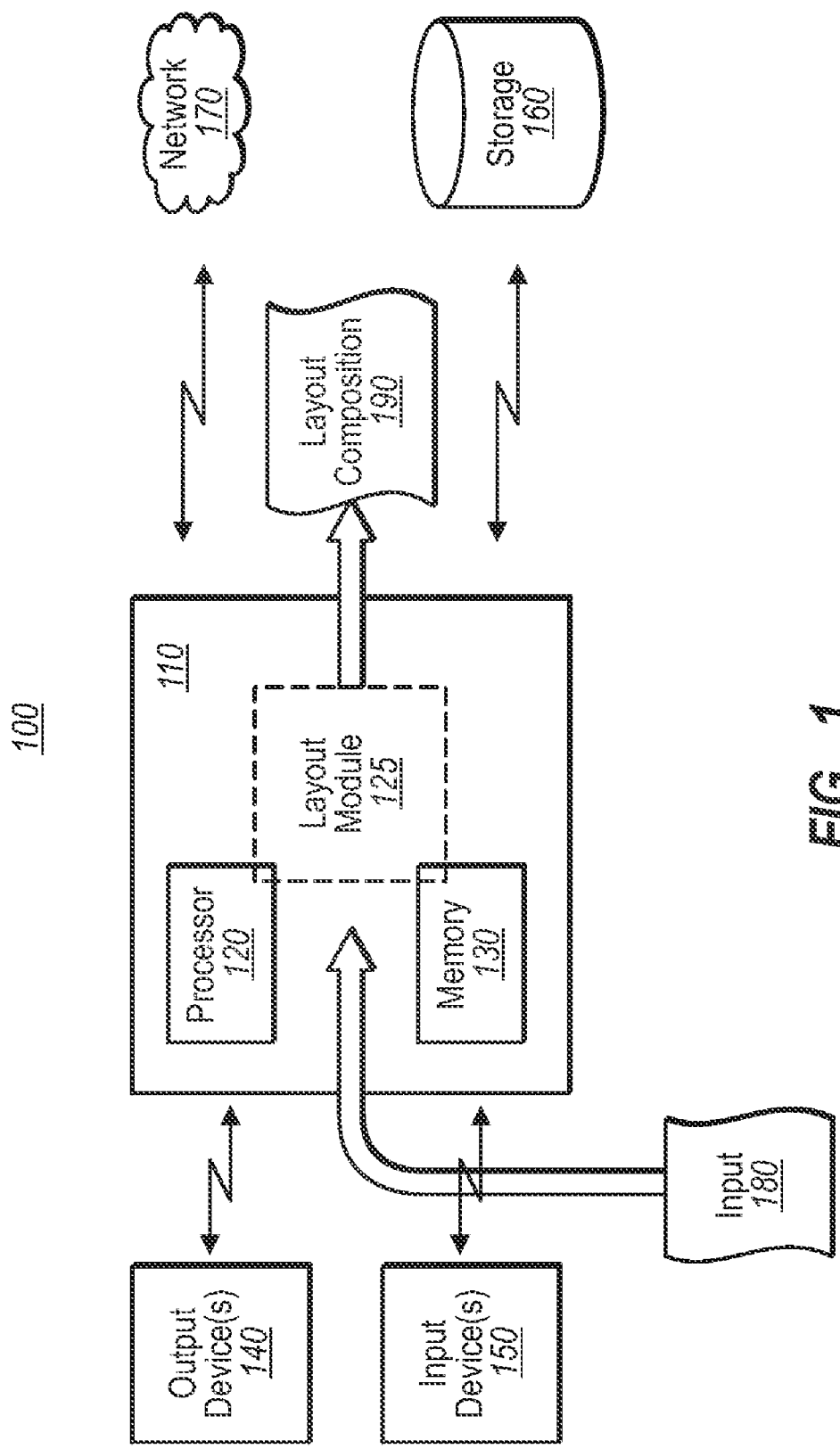
FIG. 1 depicts an example computer architecture that facilitates the creation and modification of layout compositions.

The present invention extends to methods, systems, and computer program products for the facilitating the layout and composition of graphics. The invention extends to both declarative input for creation and modification of layout compositions and also to adjustments or modifications made to layout compositions resulting from auto layout.

For example, embodiments described herein provide for a method within a computing environment which receives declarative input for composing a layout composition. The declarative input includes node identifications and layout directives and indicates relationships associating nodes within a layout composition. The declarative input, once received, is interpreted to produce a layout composition in accordance with the declarative input. The composition may be output to an output device within the computing environment.

Another example embodiment provides for a method of composing a layout composition comprising both auto-layout features and user-directed adjustments. Input is received which includes a plurality of nodes which are to be included within a layout composition. Auto-layout is applied to format the nodes within a layout composition and creates auto-layout relationships associating at least some of the nodes. User commands may be received which comprise adjustments to the layout of the nodes. In response to the user commands, the formatting of the nodes within the composition is modified in accordance with the user commands while the auto-layout relationships between the nodes is preserved.

Systems and computer program products are also described in some embodiments which facilitate the creation and modification of layout compositions. A computing system includes a layout module and an output device. The layout module is configured to receive input and to produce a layout composition. Further, the layout module may receive declarative input, user-commands, or both indicating a desired layout. The layout module can interpret the declarative input or the user-commands. The layout module may also produce a layout composition in accordance with the declarative input or the user-commands. The output device is configured to communicate with the layout module and to output the layout composition produced by the layout module.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates the creation and modification of layout compositions. The depicted computer architecture 100 includes a computing environment 110. The computing environment 110 further includes processor 120 and memory 130. Although computing environment 110 includes a single processor (processor 120), there may be any number of computer processors employed in practicing embodiments of the invention. The computer memory 130 may be RAM, ROM, flash, and any other form of computer memory which may be compatibly employed. Further, other suitable arrangements for the computing environment which include more components or fewer components than those expressly depicted may also be compatibly employed in the practice of the invention.

The computing environment also depicts a layout module 125 which may be employed in the practice of the invention. The layout module 125 is shown as encompassing the computer processor 120 as well as computer memory 130. This illustrates that the layout module may, in particular embodiments, comprise various aspects of a typical or purpose-made computing system. The layout module 125 may employ both software and hardware and may employ any or all components, features, and aspects of the computing environment (e.g., 110) in which it is employed.

The layout module 125, which may be included in the computer architecture 100 and included in the system, may be configured, in accordance with the present invention, to receive input and to produce a layout composition. The layout module 125 may also be configured to receive declarative input which indicates a desired layout and may be configured to receive user-commands indicating a desired layout. The layout module 125 may also be configured to interpret the input (e.g., declarative input or user-commands) and to produce a layout composition in accordance with the input.

The system may also include an output device 140 which is configured to communicate with the layout module and to output the layout composition which is produced by the layout module. It should be noted that the output device 140 being configured to communicate with the layout module 125 does not necessarily constrain the output device to communicate directly with the layout module. The communication between the output device and the layout module may, in fact, occur through intervening modules or processes within the system or within any suitable computer architecture, computing environment, or data communications environment. For instance, an output device may communicate with the layout module 125 through a network 170.

The declarative input or the commands (which may be user-commands) which are received by the layout module may be in the form of a markup language. Example markup languages, but not by way of limitation, are hypertext markup language ("HTML") and extensible markup language ("XML"). A markup language may also be given by an expressly defined language or application programming interface ("API") developed in conjunction with the invention.

The declarative input or the commands (which may be user-commands) which are received by the layout module may be in the form of gestures indicating adjustments to a layout composition (e.g., resulting from an auto layout). Such gestures may be received through a suitable input device. Examples of such gestures may include selecting and dragging a node within a layout using a mouse or other pointing device. Such gestures may include selecting a node within a layout and selecting a particular action which, for example, could be a translation, rotation, alignment, etc.

The declarative input or the commands (which may be user-commands) which are received by the layout module may include Boolean operators to be applied to nodes within a layout composition. Such Boolean operators may include operators which, when applied, will selectively apply adjustments or modifications to the formatting associated with a node within a layout composition based upon the node's type (e.g., "if node-type="decision" . . . "), the node's position within the composition (e.g., "if node-position="center" . . . "), the node's relationship with other nodes (e.g., "if node="child" . . . "), or any other distinguishing characteristic identifiable and associated with a node within a layout composition.

As with the output device 140, input may be received, for instance, from an input device 150. The input device may communicate with the layout module 125 but such communication is not constrained to a direct connection. For instance, the input may be communicated to the layout module 125 through a network 170 or may have been stored in a storage device 160 for later communication to the layout module 125.

The computing architecture 100 may also include at least one output device 140. There may, however, be included any number of output devices. The output devices may include displays such as CRTs, LCD monitors, projection monitors, and printers. The output devices may also include devices for recording output in permanent storage, recording output in a database, or transmitting data over a network or through a wired or wireless medium.

The computing architecture 100 may also include at least one input device 150. There may, however, be included any number of input devices. The input device may be a keyboard, a mouse, a card reader, an interface to a database, an interface to a network or an interface to wired or wireless medium. The input device may be any device or facility compatible with the invention which allows relevant data to be input to the computing system.

The computing architecture 100 may also include at least one storage device 160. The storage device 160 may be a hard disc, a CD reader and/or writer, magnetic tape, a database interface or any other device or facility compatible with the practice of the present invention.

The computing architecture 100 may also include a network 170. The network 170 includes any suitable data transmission medium as well as any and all interface devices or facilities relevant for the transmission of data over the network. For example, the network may be a local area network ("LAN"), a wide area network ("WAN"), or even the internet, as well as any and all interface hardware and software relevant for suitable data communications.

The computing architecture 100 also depicts input 180 and a layout composition 190. The input 180 may be any suitable input relevant to the practice of the invention and may or may not come through the input device 150. Input 180 may come through a network 170, from storage 160, from a keyboard, or any suitable source of data. Similarly, the layout composition 190 depicted as output may be output through an output device 140 but may also be output to or through any suitable facility such as a network 170, storage 160, a printer, a display, etc.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the systems and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 2 illustrates a flow chart of an example method 200 for producing a layout composition. The method 200 will be described with respect to the components and data as depicted in computer architecture 100.

The method 200 includes an act of receiving input 210. The input received may be declarative input for composing a layout composition. For example, the input 180 may be received through an input device 150. The declarative input may comprise node identifications and layout directives for a layout composition. The layout directives of the input may indicate layout relationships associating nodes within a layout composition.

The input may be declarative input or may be another form of input such as gestures provided by a mouse. Declarative input may be in the form of computer code in a particular computer language, may be in the form of a markup language, may be in the form of a natural-language, or may be in any form suitable for conveying the relevant information and which may be interpreted as herein described.

Declarative input received in a natural language form may appear as:
    <for all nodes, apply radial-layout algorithm to its children>
or, possibly
    <for all child nodes of current parent, position them using radial-layout>
This example would be interpreted as applying a radial layout algorithm to all children of all nodes with children. In this example, upon interpretation and application, the natural language directive would arrange all nodes which are children of other nodes as being arranged radially around the node which is the parent. FIG. 4, item 410 depicts such an arrangement. A node 412 (i.e., the parent node) has children nodes 414. The children nodes 414 are arranged in a radial fashion surrounding the parent node 412.

The declarative input may be written in a markup language. An example of such a markup language is illustrated by:
    <LayoutTemplate match="all" layout-type="Radial"/>
This input would be interpreted as applying a radial layout to all nodes. An example of such an arrangement is depicted in FIG. 4 items 410 and 420. As in the above example, the child nodes 414 are arranged radially around a parent node 412. However, in the example of item 420, there are nodes 422 which are both child nodes and also parent nodes. In interpreting the markup language input example, above, because all nodes are matched, then all children will be arranged radially. In this case, a node 424 which is a child of a child node 422 will likewise be arranged radially around its parent node 422.

Another example of declarative input in a markup language is given by the two statements:

---

<LayoutTemplate match="root-node" layout-type="Radial"/>
    <LayoutTemplate match="all" layout-type="Tree"/>

---

This example input would be interpreted as applying a radial layout to the children of a root node (or the root node, as the case may be), but then applying a tree layout to all children of nodes which are not a root node. FIG. 4 item 430 depicts the layout which would result from such interpretation and application. Node 436 depicts a root node for which its children are arranged radially. Node 432 depicts such a radially arranged node which is a child of root node 436. However, in this example, all nodes except for the explicitly codified "root-node" will have children arranged in a tree fashion. Node 432 is a node which is not a root node. A child node 434 of non-root node 432 would be arranged in a tree fashion.

As can be appreciated, the input can include node identification information which identifies nodes in many different ways, all of which are both suitable and compatible with the present invention. Nodes may be identified by their relationship to other nodes. Examples of such relationships are parent/child relationships. Nodes may be identified by their type within a layout composition. examples of such node identifications may be a start node, a decision node, a process node, an output node or other such nodes. Nodes may be identified by their position within a layout or within a sub-portion of a layout. Examples of such node identifications are center nodes (or root nodes) of radial layouts. As layout compositions may employ other ways of distinguishing nodes, such as by color, size, typeface of enclosed font, etc., any such identifiable characteristic may be used as node identification information which may be suitable when used within the input.

It may also be appreciated that the layout directives may include layout directive information which identifies many possible layout arrangements or formatting information. For instance, layout directives may include information which indicates a layout or portion of a layout should be in a radial format. Layout directives may include information which indicates a layout or portion of a layout should be in a tree format.

Layout directives may include information which indicates a layout or portion of a layout should be aligned according to a particular alignment. Layout directives may include information indicating that a layout or portion of a layout should be translated or moved a particular amount in a particular direction. Layout directives may include information indicating that a layout or portion of a layout should be translated or moved a relative amount in a relative direction. For relative amounts or directions, node identification information may be employed to provide the information necessary to determine such relative amounts or directions.

Layout directives may also include information indicating a formatting of a node or group of nodes should be linear, curvilinear, polygonal, or follow any definable geometric shape. Layout directives may include information which indicates that nodes within a layout should be arranged according to a particular graph structure. Layout directives may also include information which indicates that a layout should follow a definable path or curve such as a specified Bezier curve. Layout directives may also include information which indicates that a layout, a portion of a layout, or nodes within a layout should be arranged in freeform fashion as directed or as manually positioned.

Figure 6:
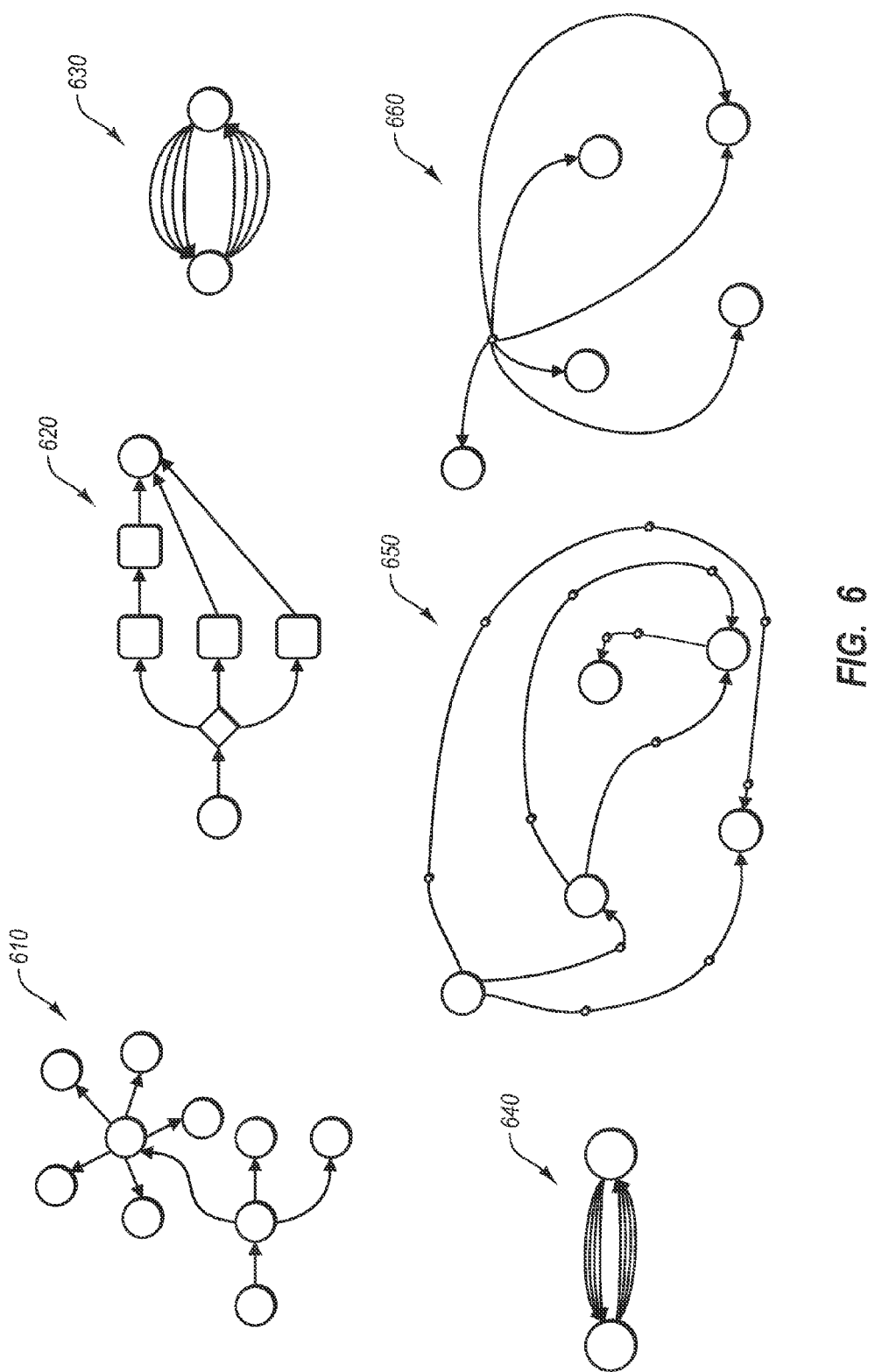
FIG. 6 illustrates layout compositions and adjustments and modifications to line routing of line segments within layout compositions in accordance with the present invention.

Layout directives may also include information indicating a formatting manner or style for line routing of line segments between nodes within a layout composition. FIG. 6 illustrates such line routing as may be directed by such layout directives. For instance, a layout directive may indicate that nodes arranged in a radial layout are to be connected with a straight line routing style which would result in the line routing of item 610. Layout directives may include information directing that line routing connections for a given shape should use Bezier or Spline routing as is illustrated in item 620. Layout directives may include information directing that whenever two nodes are connected by more than a particular number of line routing connections, then the connections are to be pooled together using a particular bundling pattern. Such a pooling and bundling of eight connections between nodes is illustrated by item 630 which, after the pooling and bundling, results in the line routing of item 640.

Layout directives may also include information which indicates that particular line routing segments are to be routed through a series of user-defined points or locations within the layout composition. Such a routing, for instance, is illustrated by item 650. Layout directives may also include information which indicates that line routing for a number of connections are to be routed through a particular point or location within a layout composition. For instance, such a line routing is illustrated by item 660.

The above examples of layout directives which specify the line routing of line segments within a layout composition are illustrative but should not be considered limiting. All such line routing directives and resulting line routing of segments within a layout composition are to be considered within the scope of the invention.

The input may also include Boolean commands which are applied to nodes within a layout. Declarative input or commands (which may be user-commands) which are received may include Boolean operators to be applied to nodes within a layout composition.

Such Boolean operators may include operators which, when applied, will selectively apply adjustments or modifications to the formatting associated with a node within a layout composition based upon the node's type (e.g., "if node-type="decision" . . . "), the node's position within the composition (e.g., "if node-position="center" . . . "), the node's relationship with other nodes (e.g., "if node="child" . . . "), or any other distinguishing characteristic identifiable and associated with a node within a layout composition.

The method 200 includes an act of interpreting the input 220. For example, input 180 may be interpreted by a layout module 125 as discussed, above, within a computing environment as depicted in FIG. 1. Also by way of example, the input 180 may be provided through an input device 150. The input, whether declarative or otherwise, and whether codified in a markup language, received in natural-language form, or otherwise, is interpreted to determine the node identifications and the layout directive information as discussed herein. The layout module 125 may, in fact, be comprised of separate input modules, interpretation modules, application modules, and production modules for the interpretation, application, and production of layout compositions from the received input.

Interpretation of the input 220 may include parsing the input to determine a portion of the input comprising node identifications. Such parsing and interpretation may, as described herein, determine the identity of nodes to which layout directives are to be applied. Such node identifications are illustrated herein, as in the above example, and may include root nodes (e.g., node 412), child nodes (e.g., both 422 and 424), a node which is a child but has no children, which is commonly called a leaf node (e.g., both 424 and 434), and an intermediate node which is both a child node and a parent node (e.g., both 422 and 432).

Node identifications, as may be appreciated, are not confined to the relative positions of nodes within a hierarchy. Node identifications may include the type of node. Such types may include shapes such as dot, circle, rectangle, triangle, etc. Such types of nodes may also include the intended representation of the node. Such intended representations may include a start node, end node, a decision node, a processing node, and other such node representations which are known in the art. The node identifications of the present invention include such node representations as are commonly found in business flow and process charting, in mathematical and engineering flow and process charting, and other particular domains.

The node identifications, as may be appreciated and as discussed herein, may be any identifiable characteristic associated with a node within a layout composition. Such a characteristic may include the type of node such as a start node, a decision node, a process node, an output node, or other such type characteristic. A characteristic may include the color, size, or other graphic information associated with a particular node within a particular layout composition. A characteristic may include a relative position of a node such as whether a node is within the first third of nodes in a process or whether a node is a beginning node of a sub-process. As may be appreciated, any identifiable characteristic associated with a node in a particular layout may be used as node identification information.

The node identifications which may be parsed and interpreted may include all types of nodes or may be restricted by the methods and systems herein described to only those node types and identifications which are relevant within a particular domain. Examples of such particular domains would include business flow and processes, mathematical or engineering flow or processes, and other such domains.

Input may also comprise layout directives and interpreting the input may also include parsing the input for such layout directives and interpreting the layout directives. Examples of such layout directives are discussed herein and include radial layouts, tree layouts, aligned layouts, snapped layouts, grouped layouts, and other such layouts as may be appreciated. Layout directives written in a markup language, layout-type="Radial" and layout-type="Tree", are examples of such layout directives. Layout directives may also be self-contained or may include subdirectives which indicate some refinement of a layout directive. A tree layout may be indicated by layout-type="Tree" while a right-facing tree (e.g., node 434) might be indicated by layout-type="RTree", or by layout-type="Tree" tree-type="Right", which would be interpreted as a subdirective modifying the tree layout directive.

The method 200 also includes an act of producing a layout 230. Once the input has been interpreted, which may include parsing input comprising node identifications and layout directives, a layout composition is produced in accordance with the input. For instance, the layout composition 190 is produced by the layout module 125 in accordance with the input 180. The resulting layout composition will satisfy each of the node identifications and layout directives which were included within the input.

It should be noted that input may be complete information for producing a complete layout composition. The input may, however, provide information which is to be applied to a layout composition which has already been produced by any other means. The input may also be information which may be applied to nodes which are already contained within an already existing layout composition. If the input were complete information, the nodes and the arrangement of the layout composition would be completely given and specified by the information in the input. If the input is to be applied to an already existing layout composition, the node identifications and layout directives would be applied to the nodes and layout arrangement of the existing layout composition to produce a modified layout composition which is consistent with the information and directives contained within the input. In such a fashion, a layout composition may be built, created, and/or modified in an incremental fashion.

It may be noted that layout directives can be given through mouse, keyboard, touch or other natural and manual input devices and interpreted at runtime by the layout system resulting in an immediate, but localized, update to the artifact's layout.

It is important to note that the compositional aspects of the layout system allow for the mixing of freeform, manually composed portions and auto layout within a single layout composition. This concept may be thought of as islands of layouts.

The method 200 includes an act which is the output of a layout composition 240. For instance, a layout composition 190, produced by a layout module 125 from input 180 may be output to an output device 140. Once input has been interpreted and a layout has been produced, as described herein, the resultant layout composition may be output to an output device 140. Such an output device, as may be appreciated may include a cathode ray tube ("CRT"), an LCD monitor, a plasma screen monitor, a printing device, computer memory, a storage device, a database, or any other suitable and compatible device.

FIG. 3 illustrates a flow chart of an example method for modifying the format of a layout composition. The method 300 will be described with respect to the components and data of computer architecture 100.

As can be appreciated, a layout composition may have been arranged by an auto-layout facility, functionality, or algorithm. It would be advantageous to modify a layout composition which already existed as being produced or previously modified by an auto-layout. It should be noted, however, that the methods and systems for modifying a layout composition are not limited to being applied to the result of auto-layout but may also be advantageously applied to layout compositions which were produced by any other means.

The method 300 includes an act of receiving input 310 comprising a plurality of nodes to be included within a layout composition. For instance, input 180 may comprise nodes and format information used to form a layout composition. It may also be appreciated that the input used to form a layout composition may come in the form of a file retrieved from a storage device 160. The input may be by declarative input such as through a markup language, input through a natural-language system, input through user interaction, or input by other compatible means. The nodes to be included may be identified by node identification information included in the input. The input may also include layout directives. Such layout directives may be interpreted and applied to both create and to constrain the layout formatting of a resulting layout composition.

The method 300 includes an act of applying auto layout 320 to the layout composition. The application of the auto layout to the layout composition will be in accordance with the input received which may comprise node identifications and may comprise layout directives. The auto layout may also be in accordance with the parameters and constraints of a particular auto layout system.

The parameters and constraints of the particular auto layout system may comprise directives or constraints which are to be applied in relevant cases and to relevant nodes within a layout composition. Auto layout may, for instance, constrain all radial layouts to a circle of a particular radius. An auto layout may, for instance, constrain all tree layout directives to extend in a particular direction (e.g., left, right, down, up). An auto layout, for instance, may constrain all nodes which are children of a decision node to be formatted both below and a particular distance to the side of the parent decision node. As can be appreciated, the application of auto layout to a layout composition can be useful to facilitate the efficient production of a layout composition but may also result in a layout composition which may not be considered by a user to be the optimum or best final layout.

Application of the auto layout also results in relationships associating one or more nodes within the layout composition. Such relationships may include which nodes are identified as parents or children of other nodes. Such relationships may include which nodes are arranged radially, as a tree, in alignment with, or any other such relationships with respect to other nodes.

The method 300 includes an act of receiving commands 330 which may comprise user commands which comprise adjustments or modifications to the layout of the nodes within a layout composition. For instance, commands may be received as input 180 through an input device 150. Such commands may be received by user interaction through a mouse, keyboard, or other suitable input device, or the commands may be received in another form such as through declarative input using a markup language or a natural language system, through a file input from a database, or any other suitable fashion. In another example, such commands are received as an input file from a storage device 160.

The commands may comprise information which comprises adjustments or modifications to the layout composition or format of nodes within a layout composition. Such adjustments may include a rotation. A rotation is depicted in layout composition 510 of FIG. 5. In the rotation of 510, a group of nodes 512 are identified by the commands. The commands also comprise a layout directive which, when interpreted, informs the method to rotate the nodes 512 a particular amount (e.g., 90 degrees) about a particular axis (e.g., about the first selected node) to result in the nodes 514 being rotated in the resulting layout composition.

Figure 5:
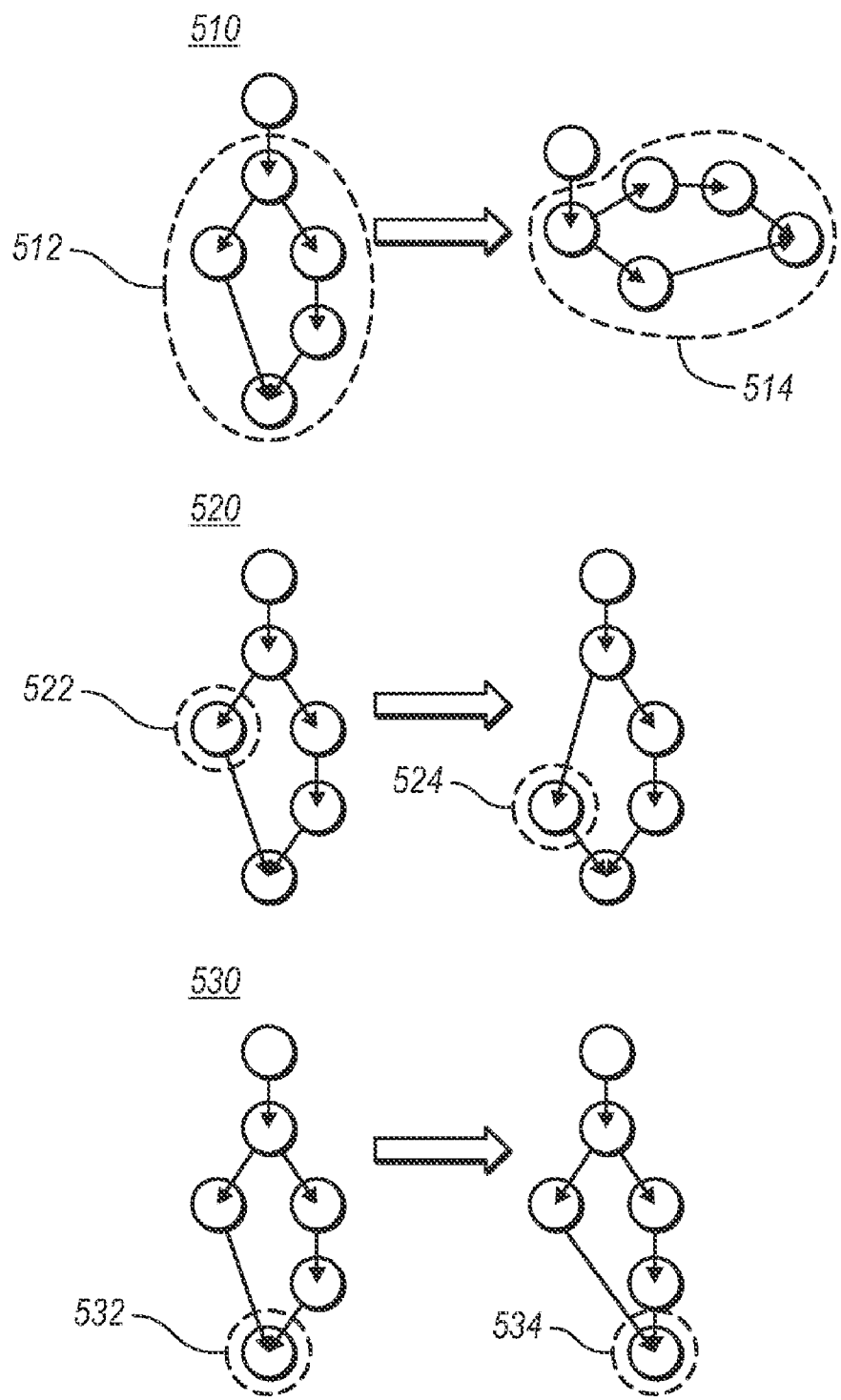
FIG. 5 illustrates layout compositions and adjustments and modifications to layout composition in accordance with the present invention.

A translation is depicted in layout composition 520 of FIG. 5. In this example case, commands may comprise information identifying a particular node and further comprise a layout directive instructing the method to translate (or shift) the identified node in a particular amount in a particular direction. In this example, the node in position 522, after the application of the command, is translated or shifted into position 524. Notably, the relationships associating the nodes are preserved after the application of the adjustment or modification. For example, the relevant node has the same parent and the same child when in the original position 522 and in the resulting position 524.

When nodes within a layout composition are adjusted or modified, the previous relationships associating nodes within the layout composition are preserved. For example, the radial children of a central root node remain the radial children of the root node.

The preservation of the relationships associating the nodes is advantageous because another command may be applied or another auto layout may be applied after the application of the command. For instance, a node which is arranged radially around a center node may be adjusted to be a larger radius away from the center than the other nodes arranged radially. In this case the relationship of center node, child node, and radially arranged is preserved after the application of the adjustment command. Because of the preservation of the association and relationship, another auto layout application or constraint may be applied (e.g., after the insertion of another node in the radial arrangement) and the adjusted node will still be arranged radially around the center node and will still be adjusted to a position a larger radius away than that provided by the auto layout.

The method 300 includes an act of modifying the format 340 of the nodes within the composition in accordance with the commands. Further, as described, the adjustments or modifications of the formatting of the nodes in accordance with the commands occurs while preserving the auto layout relationships between the nodes as created or identified by the application of the auto layout.

The act of modifying the format 340 of the nodes within a composition may comprise a rotation, a translation or shifting, a snapping of nodes onto a particular snap anchor, an alignment of nodes in a particular direction or along a particular axis, a linear adjustment, a grouping of nodes, or any arbitrary adjustment or modification.

It may further be appreciated that the layout composition which results from the adjustment or modification of an existing layout composition may also be output to an output device. For instance, a layout composition 190 may be output to an output device 140. Such an output device may be any suitable output device such as a CRT, and LCD monitor, a printer, a color plotter, computer memory, a storage device, a database, or any other suitable device.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims is used to indicate the desired specific use of such terms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:
1. A system comprising:
  one or more processors,
    memory, and
    an output device,
    wherein the memory stores computer executable instructions which when executed by the one or more processor perform a method of composing a layout composition comprising both auto-layout features and user-directed adjustments, comprising:
  receiving input comprising a plurality of nodes to be included within a layout composition which corresponds to a graphical flow chart depicting a particular process, in which each node represents a particular step or event in the process, and wherein the input further comprises information that defines how each node is interrelated to one or more other nodes in the process, wherein the input is in the form of first layout directives written in a markup language which specify a type of layout for the layout composition;
  applying auto-layout to format the nodes based on the input information that defines how each node is interrelated to one or more other nodes in the process, so that the auto-layout produces the layout composition which graphically arranges the nodes in an interconnected format that represents the process;

displaying the layout composition including displaying each of the nodes and line segments between the nodes that represent the interconnected relationships produced by the auto-layout;

receiving user commands comprising second layout directives that specify adjustments to the layout of the nodes; and in response to the received user commands, modifying the formatting of at least one node within the displayed layout composition in accordance with the user commands but doing so while still preserving the auto-layout relationships of all nodes in the layout composition except those that are directly connected to the at least one node.

2. The system of claim 1 wherein the adjustments are localized.

3. The system of claim 1 wherein the adjustments comprise a rotation.

4. The system of claim 1 wherein the adjustments comprise a translation.

5. The system of claim 1 wherein the adjustments comprise incremental control of the auto layout.

6. The system of claim 1 wherein the adjustments comprise at least one of an insertion, a deletion, add shape, alignment, or snapping.

7. The system of claim 1 wherein the adjustments comprise modifications to the line segments connecting the nodes.

8. One or more physical storage media storing computer executable instructions which when executed perform a method of composing a layout composition comprising both auto-layout features and user-directed adjustments, the method comprising:

receiving input comprising a plurality of nodes to be included within a layout composition which corresponds to a graphical flow chart depicting a particular process, in which each node represents a particular step or event in the process, and wherein the input further comprises information that defines how each node is interrelated to one or more other nodes in the process, wherein the input is in the form of first layout directives written in a markup language which specify a type of layout for the layout composition;

applying auto-layout to format the nodes based on the input information that defines how each node is interrelated to one or more other nodes in the process, so that the auto-layout produces the layout composition which graphically arranges the nodes in an interconnected format that represents the process;

displaying the layout composition including displaying each of the nodes and line segments between the nodes that represent the interconnected relationships produced by the auto-layout;

receiving user commands comprising second layout directives that specify adjustments to the layout of the nodes; and in response to the received user commands, modifying the formatting of at least one node within the displayed layout composition in accordance with the user commands but doing so while still preserving the auto-layout relationships of all nodes in the layout composition except those that are directly connected to the at least one node.

9. The one or more physical storage media of claim 8 wherein the adjustments are localized.

10. The one or more physical storage media of claim 8 wherein the adjustments comprise a rotation.

11. The one or more physical storage media of claim 8 wherein the adjustments comprise a translation.

12. The one or more physical storage media of claim 8 wherein the adjustments comprise incremental control of the auto layout.

13. The one or more physical storage media of claim 8 wherein the adjustments comprise at least one of an insertion, a deletion, add shape, alignment, or snapping.

14. The one or more physical storage media of claim 8 wherein the adjustments comprise modifications to the line segments connecting the nodes.

15. In a computing environment comprising a computer processor, memory, and an output device, a method of composing a layout composition comprising both auto-layout features and user-directed adjustments, the method comprising:

receiving input comprising a plurality of nodes to be included within a layout composition which corresponds to a graphical flow chart depicting a particular process, in which each node represents a particular step or event in the process, and wherein the input further comprises information that defines how each node is interrelated to one or more other nodes in the process, wherein the input is in the form of first layout directives written in a markup language which specify a type of layout for the layout composition; applying auto-layout to format the nodes based on the input information that defines how each node is interrelated to one or more other nodes in the process, so that the auto-layout produces the layout composition which graphically arranges the nodes in an interconnected format that represents the process;

displaying the layout composition including displaying each of the nodes and line segments between the nodes that represent the interconnected relationships produced by the auto-layout;

receiving user commands comprising second layout directives that specify adjustments to the layout of the nodes; and in response to the received user commands, modifying the formatting of at least one node within the displayed layout composition in accordance with the user commands but doing so while still preserving the auto-layout relationships of all nodes in the layout composition except those that are directly connected to the at least one node.

16. The method of claim 15, wherein the first or second layout directives specify one or more of the following:

formatting for some or all of the nodes according to a linear, curvilinear, or polygonal shape;

formatting for some or all of the nodes according to a specified graph structure;

formatting for some or all of the nodes to follow a definable path or curve;

formatting for some or all of the nodes in freeform fashion; or formatting for some or all of the line segments with a particular style.

17. The method of claim 16, wherein the particular style of the line segments is one of a straight line style, Bezier or Spline routing, a bundling pattern.

18. The method of claim 16, wherein the first or second layout directives include Boolean operators which are selectively applied to the nodes to perform the auto-layout of the layout composition or the modifications to the layout composition.

19. The method of claim 15, wherein the first or second layout directives include node identifications which specify which nodes the first or second layout directives apply to.

20. The method of claim 19, wherein the node identifications identify nodes by one or more of a start node, an end node, a decision node, a processing node, an output node, or a node characteristic including a shape, color, size, or position of a node.

* * * * *